US011416443B2

(12) United States Patent
Suarez et al.

(10) Patent No.: US 11,416,443 B2
(45) Date of Patent: Aug. 16, 2022

(54) GENERATING PREVIEW INFORMATION RELATED TO DATA MIGRATED TO ARCHIVAL MEDIA (71) Applicant: International Business Machines Corporation, Armonk, NY (US)

(72) Inventors: Jeffrey Richard Suarez, Tucson, AZ (US); Evelyn Brazelton, Tucson, AZ (US); Samantha Jean Wareing, Tucson, AZ (US); Carly Joanne Fife, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 16/799,678

(22) Filed: Feb. 24, 2020

(65) Prior Publication Data
US 2021/0263886 A1    Aug. 26, 2021

(51) Int. Cl.
*G06F 16/11* (2019.01)
*G06F 16/26* (2019.01)

(52) U.S. Cl.
CPC .......... *G06F 16/113* (2019.01); *G06F 16/26* (2019.01)

(58) Field of Classification Search
CPC ....... G06F 16/113; G06F 16/26; G06F 16/122
See application file for complete search history.

(56) References Cited

U.S. PATENT DOCUMENTS

| 8,762,634 | B2 | 6/2014 | Gensler, Jr. |
| 9,639,529 | B2 | 5/2017 | Prahlad |
| 2002/0111956 | A1 | 8/2002 | Yeo |
| 2009/0222509 | A1* | 9/2009 | King ............... H04L 67/1097 709/203 |
| 2019/0065517 | A1 | 2/2019 | Comertoglu |
| 2019/0087280 | A1* | 3/2019 | Kumar ............... G06F 16/2228 |

\* cited by examiner

*Primary Examiner* — William B Partridge
*Assistant Examiner* — Erich Alexander Fischer
(74) *Attorney, Agent, or Firm* — Heather Johnston (57) ABSTRACT

A method for generating preview information related to data migrated to archival storage media. In an embodiment, the method includes one or more computer processors identifying data designated for archival. The method further includes identifying a set of preferences associated with generating a set of preview data corresponding to the data designated for archival. The method further includes determining metadata related to the data designated for archival based on the identified set of preferences. The method further includes archiving the data designated for archival. The method further includes responding to archiving the data designated for archival by determining information associated with archiving the designated data. The method further includes generating a set of preview data corresponding to the archived designated data based, at least in part, on the determined metadata and the information associated with archiving the designated data.

20 Claims, 4 Drawing Sheets

GENERATING PREVIEW INFORMATION RELATED TO DATA MIGRATED TO ARCHIVAL MEDIA

BACKGROUND OF THE INVENTION

The present invention relates generally to the field of data storage, and more particularly to generating information samples during a backup operation to archival media.

Advances in information technology (IT) enable individuals, organizations, enterprises, and agencies to access and process ever-increasing volumes of stored information. Not all data is utilized within a short period of time of its generation. Historical electronic data, some of which is unstructured data, may need to be stored for weeks, months, or even years between usages. In addition, various regulatory and compliance requirements dictate that data is stored for extended periods of time. Hard disk drives (HDDs) and flash-memory drives are high-performance data storage devices but are not cost effective for long-term storage within an enterprise or cloud computing environment. Magnetic tapes within a tape storage system or a tape library are solutions for data storage of large sets of data and long-term data storage within an information lifecycle management process. Magnetic tape storage systems are a cost-effective solution and that can also be utilized for archival data storage and data storage for the purpose of disaster recovery.

SUMMARY

According to an aspect of the present invention, there is a method, computer program product, and/or computer system for generating preview information related to data migrated to archival storage media. In an embodiment, the method includes at least one computer processor identifying data designated for archival. The method further includes at least one computer processor identifying a set of preferences associated with generating a set of preview data corresponding to the data designated for archival. The method further includes at least one computer processor determining metadata related to the data designated for archival based on the identified set of preferences. The method further includes at least one computer processor archiving the data designated for archival. The method further includes at least one computer processor responding to archiving the data designated for archival by determining information associated with archiving the designated data. The method further includes at least one computer processors generating a set of preview data corresponding to the archived designated data based, at least in part, on the determined metadata and the information associated with archiving the designated data.

DETAILED DESCRIPTION

Embodiments of the present invention recognize that in response to performing data migrations from active storage of a computing system to an archival storage system, descriptive information related to the data to archive is not included in the archival process. Whereas, basic information (e.g., metadata) related to a file, such as file name creation date, file size, and archival date can be readily associated with a storage volume or archival media ID that stores the archived data. Embodiments of the present invention recognize that when a user subsequently wants to re-access data of interest that was archived, the original user or another user may not know particular instance or version of the data of interest that is to be restored and accessed. In some cases, the user initiates a request to recall archival media, and subsequently one or more files (i.e., data) from the archival media are restored to a primary storage system before the user can determine whether the restored files include the data of interest to the user.

Embodiments of the present invention also recognize that retrieving archival media and restoring data from archival storage media to primary storage can be time consuming; for example, greater than 10 minutes. Lengthy data restoration durations are common and can be associated with: selecting archival storage media that potentially stores the data of interest for a user, physically moving archival media within a storage library, loading (e.g., mounting) the archival media within a reading device, and restoring some or all of the data stored on the archival media to a primary storage system for review by the user. If the wrong storage media ID was selected, then the data restoration process is repeated with another archival volume until the user finds the data of interest that the user is seeking.

Embodiments of the present invention provide a solution to reduce the duration (e.g., time) associated with a user identifying the instance of archived data that is the data of interest to the user. Embodiments of the present invention generate and aggregate preview information and metadata corresponding to data to archive during the process of migrating the data from primary storage to one or more archival storage systems. Various embodiments of the present invention are incorporated within data management systems and can customize generating additional information and/or obtaining "samples" of data during the data migration and archival processes. The additional information and/or sample data is respectively associated with the metadata of the data to archive and an ID corresponding to the archival media that stores the archived data. As referred to herein, archival storage media include magnetic tape storage, optical media storage (e.g., compact disks, laser disks, digital versatile disks, etc.), and another other bulk storage devices or media utilized for archival storage of data and information.

Some embodiments of the present invention enable a user to specify and/or configure the preview data that is determined and/or generated during a data archive process. The preview data corresponds to samples of data and other information associated with the data being archived. Preview data can be viewed during a subsequent search for data of interest to the user, thereby avoiding the need to locate archival storage media and restore archived data to verify that the selected archived data is the data of interest to the user. Other embodiments of the present invention allow a user to review a plurality of preview data to identify the instance of archived data of interest to the user and dynamically restore data of interest to the user. Embodiments of the present invention can distribute differing sets of preview data among differing systems and devices to improve accessibility and security. In addition, based on security and access controls, different portions of the preview information may be displayed based on user/group ID, user device, and/or user location.

Embodiments of the present invention improve the access time to restore the data of interest to the user. Some archival storage media, such as magnetic tape cartridges are "write once, read many" media that stores data based on sequential appends. A magnetic tape cartridge may store a plurality of data, potentially of differing users, as a series of serially appended (e.g., written) sections along the media of the magnetic tape cartridge. In some cases, specific information, such as metadata or header information related to a particular instance of archived data cannot be read until the respective section of data along the magnetic tape media is found and accessed.

A further embodiment of the present invention can utilize physical position information, corresponding to an appended section, within preview data to determine the position along the magnetic storage media (e.g., tape) where a particular instance of data was written. By utilizing physical location information within the preview data information, embodiments of the present invention can use capabilities of an archival storage system to fast-forward the archival storage media enabling faster access to archived data of interest for a user.

The descriptions of the various scenarios, instances, and examples related to the present invention have been presented for purposes of illustration but are not intended to be exhaustive or limited to the embodiments disclosed.

Figure 1:
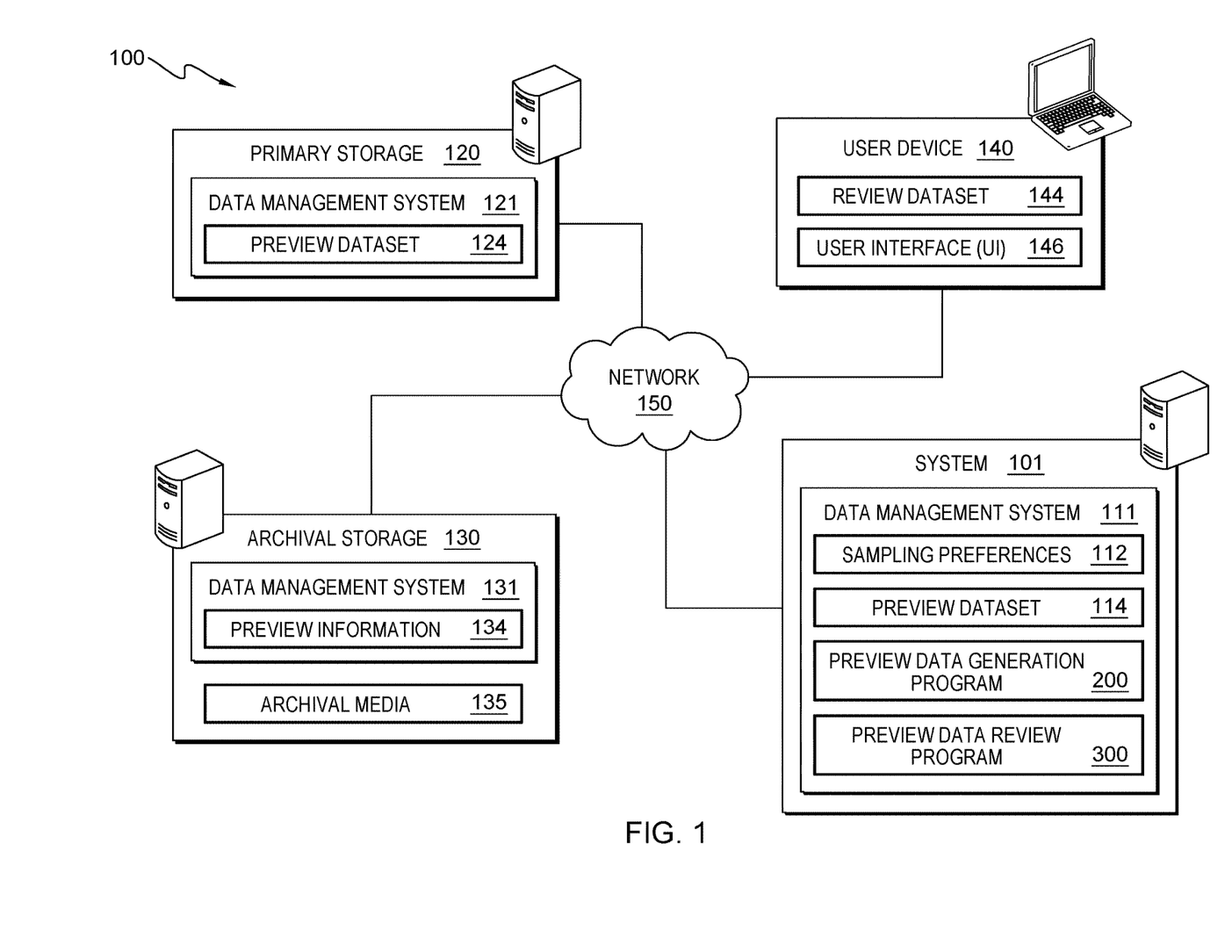
FIG. 1 illustrates a computing device environment, in accordance with an embodiment of the present invention.

The present invention will now be described in detail with reference to the Figures. FIG. 1 is a functional block diagram illustrating networked computing environment 100, in accordance with embodiments of the present invention. In an embodiment, networked computing environment 100 includes: system 101, primary storage 120, archival storage 130, and user device 140, all interconnected over network 150.

FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

System 101, primary storage 120, and user device 140 may be: laptop computers, tablet computers, netbook computers, personal computers (PC), desktop computers, personal digital assistants (PDA), smartphones, wearable devices (e.g., smart glasses, smart watches, personal fitness devices), or any programmable computer systems known in the art. In certain embodiments, system 101, primary storage 120, archival storage 130, and user device 140 represent computer systems utilizing clustered computers and components (e.g., database server computers, application server computers, storage systems, etc.) that act as a single pool of seamless resources when accessed through network 150, as is common in data centers and with cloud-computing applications. In general, system 101, primary storage 120, and archival storage 130, and user device 140 are representative of any programmable electronic device or combination of programmable electronic devices capable of executing machine readable program instructions and communicating via network 150. System 101, primary storage 120, archival storage 130, and user device 140 may include components, as depicted and described in further detail with respect to FIG. 4, in accordance with embodiments of the present invention.

In an embodiment, system 101 includes data management system 111 and a plurality of other programs and data (not shown), such as a web interface, one or more communication programs, an office productivity suite, security credentials, a database management program, etc. (not shown). In some embodiments, system 101 represents a portion of a larger computing system, such as administrative system in a data center. In another embodiment, system 101 is part of a computing system that also includes primary storage 120.

In an embodiment, data management system 111 includes sampling preferences 112, preview datasets 114, preview data generation program 200, and preview data review program 300. In another embodiment, data management system 111 of system 101, data management system 121 of primary storage 120, and data management system 131 of archival storage 130 are aspects of a larger information lifecycle management (ILM) system associated with operations of networked computing environment 100. In various embodiments, data management system 111 generates a user interface (e.g., UI 146) in association with preview data generation program 200, preview data review program 300, and/or one or more other programs and features of networked computing environment 100.

In some embodiments, data management system 111 includes additional programs and features (not shown) that are utilized to control the information presented during the display of preview datasets, such as a security function, information tokenization, etc. In addition, data management system 111 may include a set of ILM dictates that determines and/or schedules archiving data from a particular system or instance of primary storage 120 to an instance of archival storage 130, such as a time-based dictate; a storage capacity dictate (e.g., utilization percentage) of a computing system; a storage quota associated with a user, group, project, or a service level agreement (SLA); etc. In an example, data management system 111 initiates data archiving response to data management system 121 determining to release storage space based on primary storage 120 indicating a need for additional persistent storage space.

In an embodiment, sampling preferences 112 includes the preferences and dictates of a plurality of users and/or groups of users related to the information that is generated and obtained while archiving of data from within primary storage 120 to archival storage 130. In one example, sampling preferences 112 dictates that a preview file related to archiving data includes a set of information (e.g., metadata) related to a number of files included within an archive operation, file/data names, respective creation dates, respective last modified dates, a size of a group of files, a name of an author of a file, etc. In another example, sampling preferences may include dictates related to security, information included or tokenized in a subset of preview information based on a security dictate, a hierarchy of locations that store preview information, etc. In addition, sampling preferences 112 may include information and/or fields utilized to define a presentation of information by UI 146, such as displayed fields, menus, input fields, etc.

In an embodiment, preview datasets 114 includes a plurality (e.g., an aggregation) of preview data (e.g., preview information). In addition, a preview dataset within preview datasets 114 can be respectively associated with a user, a group, a team, a project, an enterprise, etc. In one embodiment, preview data within preview datasets 114 is generated or obtained during the execution of preview data generation program 200 and information obtained from one or more data management systems of networked computing environment 100. In some embodiments, preview data within preview datasets 114 can include information and metadata, such as size, number of members, member names, and other user-specified metadata that is determined and/or extracted from the data set being dumped, migrated, and/or archived from primary storage 120 to archival storage 130 and stored in a preview data set. In some embodiments, preview datasets 114 also includes sample information obtained from within the data designated for archival storage, such as program names, code snippets, text excerpts, comments dictated or input by a user; a position within an archival storage media where the archived data is located; etc.

In another embodiment, a preview dataset (e.g., a group of preview data) of preview datasets 114 is based on a data structure formatted such that a list of datasets corresponding to archived data is stored at the beginning of the preview dataset. Each set of preview data (e.g., preview information) included within the list of preview data is associated with or mapped to a respective relative byte location (RBL) within a preview dataset where other information (e.g., sample data, other metadata) resides for the data set that was archived. Utilizing a mapped location associated to a respective RBL, preview dataset and/or metadata is accessed more quickly as opposed to performing sequential searches the preview data set for a specific set of preview data. In other embodiments, preview datasets 114 can be based on other formats, such as associative arrays, documents, spreadsheets, etc.

Preview data generation program 200 is a program that obtains metadata, sample data, and other information related to data designated for archiving by one or more data management systems of networked computing environment 100. In an embodiment, preview data generation program 200 is a function included within data management system 111. In one scenario, preview data generation program 200 executes (e.g., initiates) in response to one or more ILM actions performed by a data management system within networked computing environment 100, such as data management system 121 within primary storage 120 determining to archive data. In another scenario, preview data generation program 200 executes in response to a user of user device 140 interfacing with a data management system 111 to designate data within primary storage 120 for archival storage.

While the archival process is occurring between primary storage 120 and archival storage 130, preview data generation program 200 obtains a set (e.g., a collection) of data, such as metadata related to a size of a file, number of members (e.g., files) within a dataset, a list of a group of files included within a dataset, names of a group of user; and other user-specified metadata that is extracted from the set of data being archived; and/or sample data extracted from the data (e.g., files) to archive. In addition, preview data generation program 200 obtains information related to archiving the data, such as an archival media volume ID and/or a sequence or position along the archival media where the archived data is stored. In another embodiment, preview data generation program 200 can temporarily store the obtained set of within one or more locations, such as preview dataset 124 and/or preview information 134 for review by a user prior to saving the set of obtained data and/or sample information. Subsequently, preview data generation program 200 stores the collection of data within one or more preview datasets, such as preview dataset 114, preview dataset 124, and/or preview dataset 144.

In some embodiments, preview data generation program 200 formats a preview dataset such that a list of data sets would be at the beginning of the preview data set and are associated with a relative byte location (RBL) of where the sample data resides for the data set that was backed up. Utilizing RBL information allows for a method to more quickly read the sample data without having to perform one or more sequential searches of a preview dataset to obtain information related to archived data. In other embodiments, preview data generation program 200 does not generate preview datasets in response to data management system 111 determining that the data designated for archiving is related to operations of a computing system (not shown) that includes primary storage 120, such as dump files, log files, etc.

Preview data review program 300 is a program that identifies and presents a selection of preview data to a user and enables the user to identify and locate specific data of interest for the user that is archived from among a plurality of data within archival storage. In an embodiment, preview data review program 300 executes in response to a user activating UI 146. In various embodiments, preview data review program 300 enables the user to select from among a plurality of preview data corresponding to archived data, to identify and restore archived data of interest to the user to a primary storage system (e.g., of a computing system, of a cloud computing system). In various embodiments, preview data review program 300 utilizes the RBL formatting of a preview dataset to identify sets of information that enable a user to identify data of interest to the user and a location (e.g., archival storage system and archival media volume) that store the data of interest to the user.

In some embodiments, one or more aspects of preview data review program 300 are installed on user device 140. In various embodiments, preview data review program 300 utilizes data management system 111 to generate one or more graphical elements or menus within UI 146 that enable a user to view a group of preview data and select one or more instances of archived data to restore from among the viewed group of preview data. Preview data review program 300 may also utilize another feature within UI 146 to enable the user to dictate a location, such as a mapped drive to receive the selected archived data that is restored.

In an embodiment, primary storage 120 is representative of a storage subsystem included within or associated with a larger computing system or a data center. In another embodiment, primary storage 120 represents a portion of system 101. In some embodiments, primary storage 120 represents a storage node or system of a storage architecture, such as an object storage environment, a network-attached storage device, a storage area network, and/or a cloud storage environment. In one embodiment, primary storage 120 includes data management system 121, preview dataset 124, and a plurality of other programs and data (not shown). In various embodiments, primary storage 120 can include a plurality of storage devices and the storage devices can be of differing technologies, such as hard disk drives, flash memory devices, magnetoresistive random-access memory (MRAM), or other non-volatile storage know in the art utilized for on-line/system storage. Primary storage 120 may also include virtualized persistent/non-volatile allocated to logical partitions, virtual machines, etc.

In one embodiment, data management system 121 is part of a data management and ILM system within networked computing environment 100. In another embodiment, data management system 121 is a program that archives (e.g., migrates) data from within primary storage 120 to archival storage 130 for long-term storage, backups, and/or disaster recovery. In various embodiments, data management system 121 generates and/or identifies a set of information (e.g., metadata) related to archiving data based on information included within sampling preferences 112. In some embodiments, data management system 121 also enables a user and/or preview data generation program 200 to select/sample items from within the data to archive, which may be temporarily stored within preview dataset 124.

In an embodiment, preview dataset 124 includes information obtained by data management system 121 based on information included within sampling preferences 112 related to archiving data, such as metadata corresponding to the data to archive. Examples of obtained metadata may include a size of file or dataset, number of files and/or datasets archived, file/data names, other user-specified metadata, etc. Preview data generation program 200 may temporarily store the obtained set of information within preview dataset 124 while additional sample information is obtained, such as code snippets, text excerpts, etc. In addition, instances of preview dataset 124 from a plurality of respective instances of primary storage 120 are aggregated within preview datasets 114 of system 101.

Archival storage 130 is representative of one or more storage systems within networked computing environment 100. An instance of archival storage 130 includes a plurality of storage devices and/or storage media utilized for long-term storage of infrequently accessed information, a backup for large datasets, and/or secure storage of data for disaster recovery. In one example, an instance of archival storage 130 may be an automated tape library. In another example, archival storage 130 may be an optical disk jukebox.

In an embodiment, archival storage 130 includes data management system 131, archival media 135, and other programs and data (not shown). Examples of other programs and data that archival storage 130 may include are an encryption/decryption program, a data compression/decompression program, an access control program, communication programs, a database management system, a library of information associated with the plurality of instances of archival media 135 stored within archival storage, etc. In some embodiments, archival storage 130 can include capabilities to store data on differing types of archival storage media.

In one embodiment, data management system 131 is part of a data management and ILM system within networked computing environment 100. In another embodiment, data management system 131 is a program for archiving data sent (e.g., migrated to) archival storage 130 and for restoring archived data archival storage 130 to one or more systems of networked computing environment 100, such as primary storage 120. In various embodiments, data management system 131 generates a set of information related to archiving data from primary storage 120 to a media within archival media 135 based on information included within sampling preferences 112. The generated set of information is stored, at least temporarily, within preview information 134. In an embodiment, data management system 131 receives additional information and/or dictates from preview data generation program 200. In some embodiments, information within preview information 134 is transmitted to system 101 for inclusion within a set of preview data stored at least preview datasets 114 in addition to information associated with archiving data by primary storage 120.

In one embodiment, archival media 135 is representative of a plurality of magnetic storage media associated with one or more types and capacities of storage media, such as a linear tape-open (LTO™) cartridge or another type of magnetic tape cartridge. In another embodiment, archival media 135 is representative of a plurality of optical storage media, such as compact discs (CDs), digital versatile disks (DVDs), etc. In various embodiments, each instance of archival media 135 includes a corresponding identifier, such as an ID, a serial number, a volume ID, etc. The corresponding identifier may include an optical identifier, such as a barcode; an electronic identifier, such as an embedded radio-frequency ID device or non-volatile memory device; and/or an ID stored on the magnetic tape of the archival media.

User device 140 may represent a laptop computer, a tablet computer, a desktop computer etc. User device 140 includes preview dataset 144, user interface (UI) 146, and other programs and data (not shown), such as a web interface, one or more communication programs, an office productivity suite, security credentials, a software compiler, etc. (not shown).

In one embodiment, preview dataset 144 includes sets of preview data (e.g., preview information) related to a plurality of archived data associated with the user. In another embodiment, preview dataset 144 includes a plurality of sets of preview data related to archived data associated one or more groups, projects, organizations, etc., that the user is a member. In various embodiments, preview dataset 144 utilizes the same data structure (e.g., formatting) as preview datasets 114.

In various embodiments, UI 146 is generated by an application, such as data management system 111 that a user can execute in association with user device 140, system 101, and/or primary storage 120. In one embodiment, UI 146 controls sequences of actions that the user utilizes to confirm update information and/or issue commands associated with preview data generation program 200 in response to generating preview datasets; and/or actions related to preview data review program 300, such as selecting one or more instances of archived data to restore and a location (e.g., a system, a mapped drive, etc.) that receives the restored data, based on information presented to a user. In another embodiment, UI 146 also enables a user or group of users to define and/or modify one or more respective preferences within sampling preferences 112, such as input fields, menus, specifying information fields that are tokenized, etc.

In one embodiment, UI 146 may be a graphical user interface (GUI) or a web user interface (WUI). UI 146 can display (i.e., present) text, documents, forms, web browser windows, user options, application interfaces, and instructions for operation, and include the information, such as graphic, text, and sound that a program presents to a user. In some embodiments, a user of user device 140 can interact with UI 146 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 146 operating within the GUI environment of user device 140. UI 146 accepts input from one or more input/output (I/O) devices (not shown) including, but not limited to, a tactile sensor interface (e.g., a touch screen, a touchpad), a virtual interface device, and/or a natural user interface (e.g., voice control unit, motion capture device, eye tracking, cyberglove, etc.). In addition to the audio and visual interactions, UI 146 may receive input in response to a user of user device 140 utilizing natural language, such as written words or spoken words, that user device 140 identifies as information and/or commands.

Figure 2:
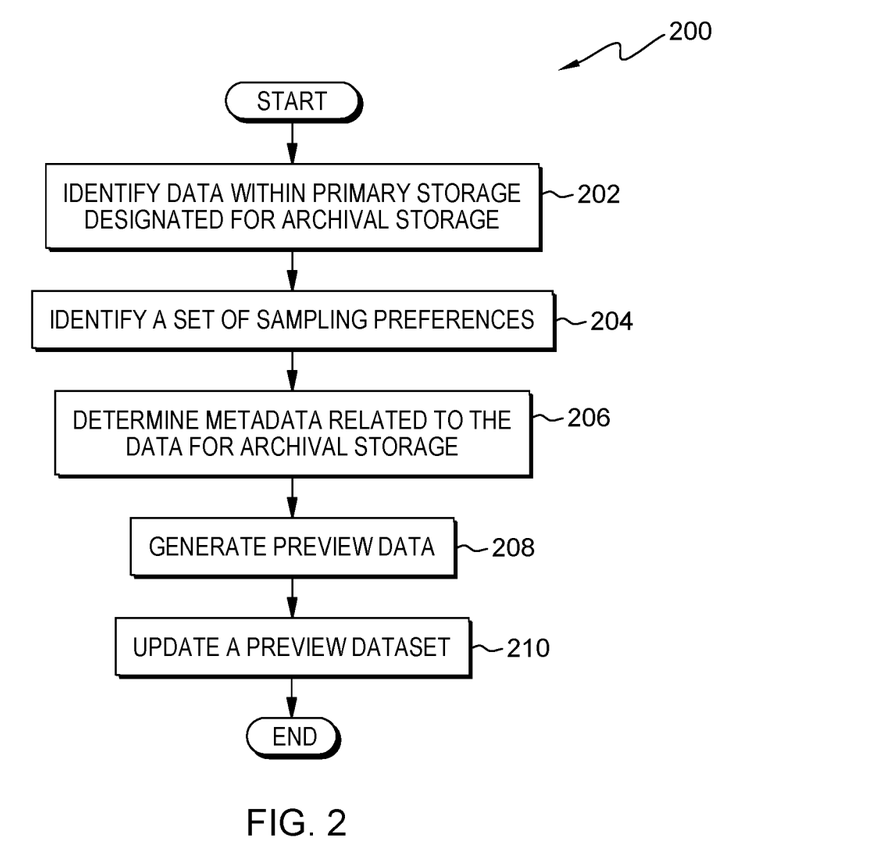
FIG. 2 depicts a flowchart of steps of a preview data generation program, in accordance with an embodiment of the present invention.

FIG. 2 is a flowchart depicting operational steps for preview data generation program 200, a program that generates and stores metadata, and obtains samples of other information related to data designated for archiving, in accordance with embodiments of the present invention. In various embodiments, preview data generation program 200 executes concurrently with archiving data from primary storage to archival storage.

In step 202, preview data generation program 200 identifies data within primary storage designated for archival storage. In one embodiment, preview data generation program 200 identifies data within primary storage 120 designated for archival storage based on one or more ILM dictates utilized by data management system 111. In another embodiment, preview data generation program 200 identifies data designated for archival storage based on information received from data management system 121 executing within an instance of primary storage 120, such as a user account approaching a storage capacity quota, or primary storage 120 requires additional free storage capacity to process a scheduled workload.

In another embodiment, preview data generation program 200 identifies data designated for archival storage to an instance of archival storage 130 based on information received from user device 140. Preview data generation program 200 may receive information via data management system 111 that a user of user device 140 indicates to archive data of primary storage 120. In one example, preview data generation program 200 receives data archival dictates manually input via UI 146, such as archiving a completed project or a library of back-level code. In another example, preview data generation program 200 receives data archival dictates generated by a script or other function executing within user device 140.

In step 204, preview data generation program 200 identifies a set of sampling preferences. In one embodiment, preview data generation program 200 identifies a set of sampling preferences from within sampling preferences 112. In some embodiments, preview data generation program 200 identifies a set of sampling preferences that are respectively associated with a user, a team, a project, an enterprise, etc. In another embodiment, preview data generation program 200 can receive additional sampling preference information, one or more modifications to sampling preference information, and/or a dictated set of sampling preferences via UI 146 of user device 140.

In step 206, preview data generation program 200 determines metadata related to the data for archival storage. In an embodiment, preview data generation program 200 determines metadata (discussed above) related to the data designated for archival storage based on transmitting a copy of the identified set of sampling preferences to data management system 121 executing on the instance of primary storage 120 that includes the data designated to archive. In response, preview data generation program 200 obtains, from database management system 121, the metadata related to the transmitted set of sampling preferences. In another embodiment, preview data generation program 200 obtains metadata related to the data designated for archival storage from an instance of data management system 111 that manages networked computing environment 100.

In step 208, preview data generation program 200 generates preview data. In an embodiment, preview data generation program 200 generates preview data based on combining information from two or more sources, such as the metadata determined by data management system 121 of primary storage 120 and other data/information determined by data management system 131 of archival storage 130 corresponding to the data being archived. For example, preview data generation program 200 generates a set of preview data based on including additional information from within preview information 134 that corresponds to the data being archived, such as an archival media ID, a location along the archival media where the data is stored, data compression information, etc., with metadata associated with the data to archive. In various embodiments, preview data generation program 200 can dynamically present the set of preview data to a user via UI 146 for approval and/or modification.

In step 210, preview data generation program 200 updates a preview dataset. In various embodiments, preview data generation program 200 enables a user of user device 140 to verify (e.g., add, delete, modify the metadata and/or archival information) the generated set of preview data that corresponds to the data being archived prior to including the set of preview data within a preview dataset, such as preview datasets 114. In some embodiments, preview data generation program 200 further updates a set of preview data, prior to inclusion within a preview data set, to include other information (e.g., one or more information samples), such as comments, a code snippet, a text excerpt, etc., input by a user via UI 146.

In various embodiments, in response to updating (e.g., finalizing) a set of preview data that corresponds to data that is archived, preview data generation program 200 stores the finalized preview dataset to preview datasets 114. In addition, in one scenario preview data generation program 200 updates preview dataset 144 of user device 140 to include the set of preview data related to the data is archived (e.g., the current data archival process). In another scenario, preview data generation program 200 updates preview dataset 144 of user device 140 to include a subset of the preview information included within preview datasets 114 based on sampling preferences and security constraints related to the data being archived. In other embodiments, if one or more preview dataset utilizes a formatting structure that includes RBL information, then preview data generation program 200 updates a preview dataset to includes modifications to the RBL information based on the included set of preview data.

Figure 3:
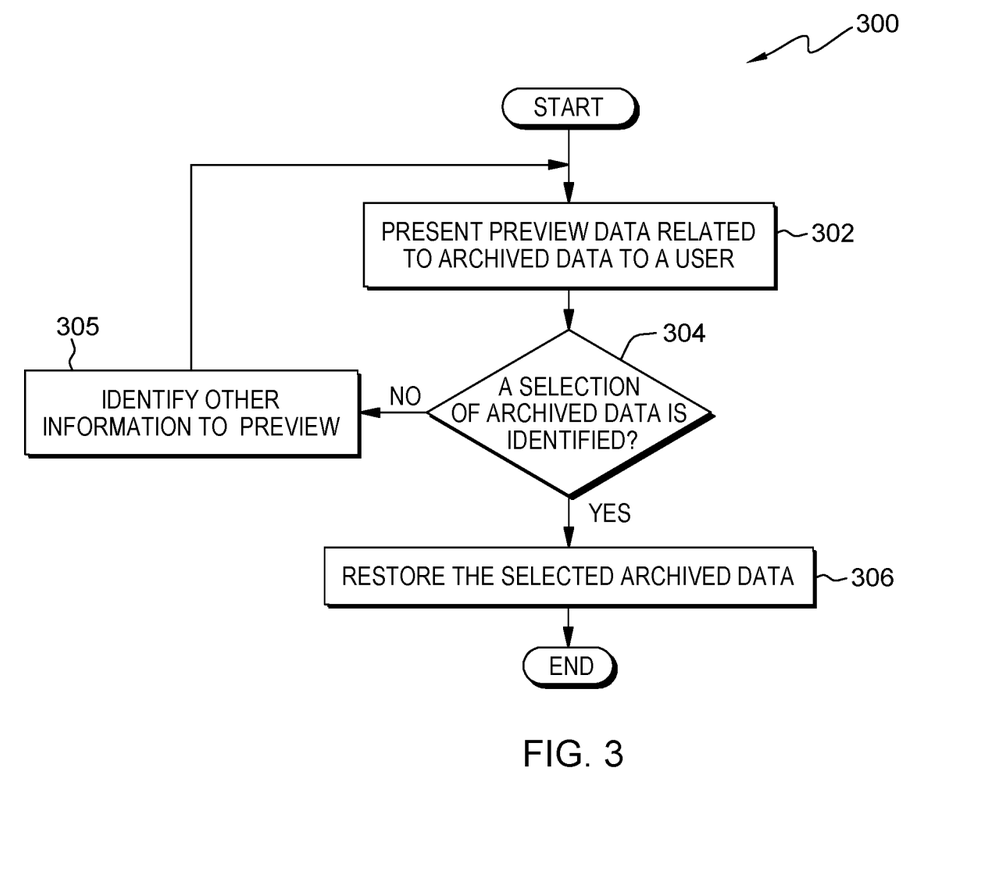
FIG. 3 depicts a flowchart of steps of a preview data review program, in accordance with an embodiment of the present invention.

FIG. 3 is a flowchart depicting operational steps for preview data review program 300, a program that presents (e.g., enables a user to browse) one or more preview datasets that can include preview data (e.g., information) related to a plurality of archived data to identify data of interest to the user. In addition, preview data review program 300 enables the user to select from among a plurality of presented sets of preview data and restore archived data corresponding to the selected preview data.

In step 302, preview data review program 300 presents preview data related to archived data to a user. A user may refer to an individual or a member of a group, a project, a team, etc. Preview data review program 300 presents a set of preview data related to archived data utilizing UI 146. Preview data (i.e., information) includes one or more elements of information previously discussed above. In one embodiment, preview data review program 300 presents a set of preview data related to archived data based on one or more system preferences or information respectively associated with a user within user preferences 112. For example, preview data review program 300 may present preview data corresponding to archived data in stages, such as a general selection of information or information based on a criteria or an element of metadata. Subsequently, preview data review program 300 receives first user selection. In response, preview data review program 300 displays addition information, such as sample data, or a larger set of metadata information. A user utilizes UI 146 to identify (e.g., indicate)

a selection of archived data to restore from among the preview data presented to the user.

In some embodiments, preview data review program 300 restricts presentation of elements of preview information related to archived data based on security dictates, such as a security clearance assigned to a user and/or a security level associated with an element of the preview information. In an example, preview data review program 300 may not present preview information related to archived data, such as a project name, team members associated with the archived data, snippets of program code, etc., based on a security level respectively assigned to a member (i.e., user) of a team. In another embodiment, preview data review program 300 presents the user preview data from one or more other sources identified during step 305.

In decision step 304, preview data review program 300 determines whether a selection of archived data is identified. In an embodiment, preview data review program 300 determines that a selection of archived data is identified to restore based on one or more user actions inputted via UI 146 of user device 140.

Responsive to determining that a selection of archive data is identified (Yes branch, decision step 304), preview data review program 300 restores the selected archived data (step 306).

In step 306, preview data review program 300 restores the selected archived data. In addition, preview data review program 300 may present the user via UI 146 one or more fields, list of systems, and/or mapped drives that enables the user to dictate the location that receives the data that is restored. In one embodiment, preview data review program 300 interfaces with data management system 131 included within the instance of archival storage 130 to restore the archived data selected by the user based on an ID, serial number, volume number, etc., corresponding to the instance of archival media 135 identified within the preview data related to the data selected to restore.

In a some embodiments, if preview data review program 300 determines that the preview dataset selected by the user also includes information corresponding to a position within the archival storage media where the selected data is stored, then preview data review program 300 can utilize data management system 131 of archival storage 130 to access and restore the selected data more quickly. For example, based on a location within the preview data corresponding to the data selected to restore, preview data review program 300 utilizes data management system 131 to instruct archival storage 130 load the instance of archival media 135 that store the selected data and fast-forward to the location along the media that includes the data selected to restore.

Referring to decision step 304, responsive to determining that a selection of archived data is not identified (No branch, decision step 304), preview data review program 300 identifies other information to preview (step 305).

In step 305, preview data review program 300 identifies other data to preview. In one embodiment, if preview dataset 144 (e.g., user defined primary search location) of user device 140 did not include the preview data related to the data of interest to the user, then preview data review program 300 identifies one or more sources of preview data for presentation to the user. For example, preview data review program 300 can identify preview dataset 114 of system 101 or another information source (not shown) identified within user preferences 112 related to the user. Subsequently, preview data review program 300 presents the other identified data for preview the user in step 302. In another embodiment, preview data review program 300 can identify other information to preview based on a user accessing, via UI 146, one or more preview datasets as another entity, such as logging-in under a group ID or a project name that include the user as a member.

Figure 4:
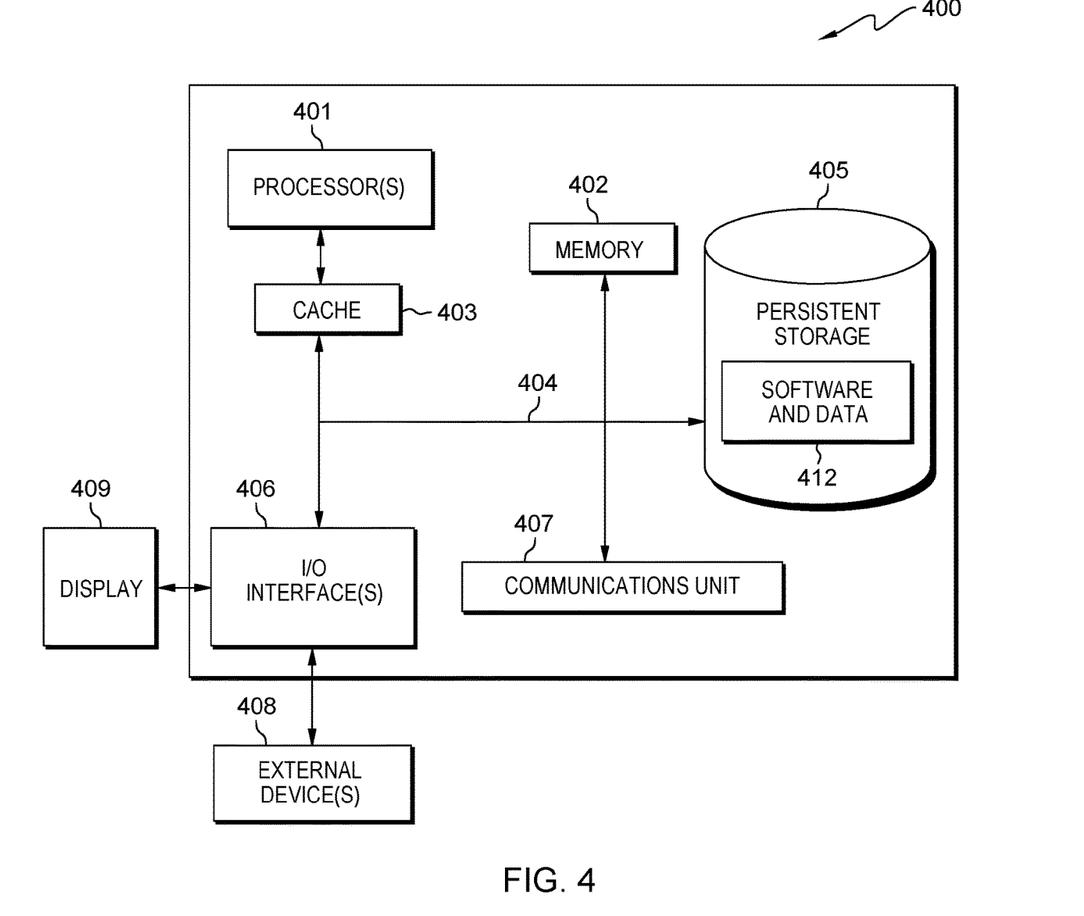
FIG. 4 is a block diagram of components of a computer, in accordance with an embodiment of the present invention.

FIG. 4 depicts computer system 400, which is representative of system 101, primary storage 120, archival storage 130, and user device 140. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. In an embodiment, persistent storage 405 include storage 110.

The media used by persistent storage 405 may also be removable. In one example, a removable hard drive may be used for persistent storage 405. In another embodiment, persistent storage 405 also represents one or more instances of removeable archival media 135, such as an LTO™ tape cartridge. Other examples include optical and magnetic disks, thumb drives, smart cards that are inserted into a drive for transfer onto another computer readable storage medium that is also part of persistent storage 405.

Software and data 412 are stored in persistent storage 405 for access and/or execution by one or more of the respective processor(s) 401 via cache 403 and one or more memories of memory 402. With respect to system 101 software and data 412 data management system 111, sampling preferences 112, preview dataset 114, preview data generation program 200, preview data review program 300, and other programs and data (not shown). With respect to primary storage 120 software and data 412 data management system 121, preview dataset 124, and other programs and data (not shown). With respect to archival storage 130 software and data 412 data management system 131, preview information 134, and other programs and data (not shown). With respect to user device 140 software and data 412 preview dataset 144, UI 146, and other programs and data (not shown).

Communications unit 407, in these examples, provides for communications with other data processing systems or devices, including resources and program executing on the Internet (not shown). In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone. Alternatively, display 409 displays information to a user based on a projection technology, such as virtual retinal display, a virtual display, etc.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a sequence of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more computer processors, digital data designated for archival;
   identifying, by one or more computer processors, a set of preferences associated with generating a set of preview data corresponding to the digital data designated for archival;
   determining, by one or more computer processors, metadata related to the digital data designated for archival based on the identified set of preferences;
   archiving, by one or more computer processors, the digital data designated for archival;
   responsive to archiving the digital data designated for archival, generating, by one or more computer processors, information associated with archiving the designated data on an archival storage media; and
   generating, by one or more computer processors, a set of preview data corresponding to the archived designated data based, at least in part, on the determined metadata and the information associated with archiving the designated data on the archival storage media, wherein the set of preview data is stored in a preview dataset on the archival storage media.

2. The method of claim 1, wherein the metadata related to the digital data designated for archival includes one or more items selected from the group consisting of a number of files within a group of files, a name corresponding to a file of the group of files, a size corresponding to the group of files, and a creation date corresponding to each file of the group of files.

3. The method of claim 1, wherein information associated with archiving the designated data includes one or more items selected from the group consisting of an ID corresponding to the archival storage media utilized to store the archived designated data, data compression information, and a location along the archival media storage volume that indicates where the archived designated data is stored, and wherein the archival storage media is based on magnetic tape technology.

4. The method of claim 1, further comprising:
   presenting, by one or more computer processors, to a user, the set of preview data corresponding to the archived designated data;
   determining, by one or more computer processors, whether the user verifies the set of preview data corresponding to the archived designated data; and
   responsive to determining that the user verifies the set of preview data corresponding to the archived designated data, updating, by one or more computer processors, the preview dataset to include the set of preview data corresponding to the archived designated data, wherein the preview dataset includes a plurality of sets of preview data that correspond to a plurality of archived data.

5. The method of claim 4:
   wherein the preview dataset is based on a data structure that maps respective portions of the metadata that correspond to the plurality of archived data at a beginning of the preview dataset; and
   wherein the preview dataset includes respective relative byte location (RBL) information corresponding to other information of a set of preview information respectively distributed within the preview dataset at RBL locations respectively associated with the plurality of preview data corresponding to the plurality of archived data.

6. The method of claim 1, further comprising:
   presenting, by one or more computer processors, to a user, the set of preview data corresponding to the archived designated data;
   determining, by one or more computer processors, that the user indicates to update the set of preview data corresponding to the archived designated data;
   receiving, by one or more computer processors, from the user, one or more additional elements of information to include among the set of preview data; and
   updating, by one or more computer processors, the preview dataset to include the set of preview data corresponding to the archived designated data, wherein the preview dataset includes a plurality of sets of preview data that correspond to a plurality of archived data.

7. The method of claim 6, wherein one or more additional elements of information to include among the set of preview data are selected from the group consisting of a code snippet from within the digital data designated for archival, a text excerpt from within the digital data designated for archival, a comment input by the user.

8. A computer program product, the computer program product comprising:
one or more computer readable storage media and program instructions stored on the one or more computer readable storage media, the program instructions readable/executable by one or more computer processors:
program instructions to identify digital data designated for archival;
program instructions to identify a set of preferences associated with generating a set of preview data corresponding to the digital data designated for archival;
program instructions to determine metadata related to the digital data designated for archival based on the identified set of preferences;
program instructions to archive the digital data designated for archival;
responsive to archiving the digital data designated for archival, program instructions to generate information associated with archiving the designated data on an archival storage media; and
program instructions to generate a set of preview data corresponding to the archived designated data based, at least in part, on the determined metadata and the information associated with archiving the designated data on the archival storage media, wherein the set of preview data is stored in a preview dataset on the archival storage media.

9. The computer program product of claim 8, wherein the metadata related to the digital data designated for archival includes one or more items selected from the group consisting of a number of files within a group of files, a name corresponding to a file of the group of files, a size corresponding to the group of files, and a creation date corresponding to each file of the group of files.

10. The computer program product of claim 8, wherein information associated with archiving the designated data includes one or more items selected from the group consisting of an ID corresponding to the archival storage media utilized to store the archived designated data, data compression information, and a location along the archival media storage volume that indicates where the archived designated data is stored, and wherein the archival storage media is based on magnetic tape technology.

11. The computer program product of claim 8, further comprising:
program instructions to present, to a user, the set of preview data corresponding to the archived designated data;
program instructions to determine whether the user verifies the set of preview data corresponding to the archived designated data; and
responsive to determining that the user verifies the set of preview data corresponding to the archived designated data, program instructions to update the preview dataset to include the set of preview data corresponding to the archived designated data, wherein the preview dataset includes a plurality of sets of preview data that correspond to a plurality of archived data.

12. The computer program product of claim 10:
wherein the preview dataset is based on a data structure that maps respective portions of the metadata that correspond to the plurality of archived data at a beginning of the preview dataset; and
wherein the preview dataset includes respective relative byte location (RBL) information corresponding to other information of a set of preview information respectively distributed within the preview dataset at RBL locations respectively associated with the plurality of preview data corresponding to the plurality of archived data.

13. The computer program product of claim 8, further comprising:
program instructions to present, to a user, the set of preview data corresponding to the archived designated data;
program instructions to determine that the user indicates to update the set of preview data corresponding to the archived designated data;
program instructions to receive from the user, one or more additional elements of information to include among the set of preview data; and
responsive to receiving the one or more additional elements of information to include among the set of preview data, program instructions to update the preview dataset to include the set of preview data corresponding to the archived designated data, wherein the preview dataset includes a plurality of sets of preview data that correspond to a plurality of archived data.

14. The computer program product of claim 11, wherein one or more additional elements of information to include among the set of preview data are selected from the group consisting of a code snippet from within the digital data designated for archival, a text excerpt from within the digital data designated for archival, a comment input by the user.

15. A computer system, the computer system comprising:
one or more computer processors;
one or more computer readable storage media; and
program instructions stored on the computer readable storage media for execution by at least one of the one or more computer processors, the program instructions comprising:
program instructions to identify digital data designated for archival;
program instructions to identify a set of preferences associated with generating a set of preview data corresponding to the digital data designated for archival;
program instructions to determine metadata related to the digital data designated for archival based on the identified set of preferences;
program instructions to archive the digital data designated for archival;
responsive to archiving the digital data designated for archival, program instructions to generate information associated with archiving the designated data on an archival storage media; and
program instructions to generate a set of preview data corresponding to the archived designated data based, at least in part, on the determined metadata and the information associated with archiving the designated data on the archival storage media, wherein the set of preview data is stored in a preview dataset on the archival storage media.

16. The computer system of claim 15, wherein the metadata related to the digital data designated for archival includes one or more items selected from the group consisting of a number of files within a group of files, a name corresponding to a file of the group of files, a size corresponding to the group of files, and a creation date corresponding to each file of the group of files.

17. The computer system of claim 15, wherein information associated with archiving the designated data includes one or more items selected from the group consisting of an ID corresponding to the archival storage media utilized to store the archived designated data, data compression information, and a location along the archival media storage volume that indicates where the archived designated data is stored, and wherein the archival storage media is based on magnetic tape technology.

18. The computer system of claim 15, further comprising:
program instructions to present, to a user, the set of preview data corresponding to the archived designated data;
program instructions to determine whether the user verifies the set of preview data corresponding to the archived designated data; and
responsive to determining that the user verifies the set of preview data corresponding to the archived designated data, program instructions to update the preview dataset to include the set of preview data corresponding to the archived designated data, wherein the preview dataset includes a plurality of sets of preview data that correspond to a plurality of archived data.

19. The computer system of claim 18:
wherein the preview dataset is based on a data structure that maps respective portions of the metadata that correspond to the plurality of archived data at a beginning of the preview dataset; and
wherein the preview dataset includes respective relative byte location (RBL) information corresponding to other information of a set of preview information respectively distributed within the preview dataset at RBL locations respectively associated with the plurality of preview data corresponding to the plurality of archived data.

20. The computer system of claim 15, further comprising:
program instructions to present, to a user, the set of preview data corresponding to the archived designated data;
program instructions to determine that the user indicates to update the set of preview data corresponding to the archived designated data;
program instructions to receive from the user, one or more additional elements of information to include among the set of preview data; and
responsive to receiving the one or more additional elements of information to include among the set of preview data, program instructions to update the preview dataset to include the set of preview data corresponding to the archived designated data, wherein the preview dataset includes a plurality of sets of preview data that correspond to a plurality of archived data.

* * * * *